(12) United States Patent
Jorgensen et al.

(10) Patent No.: US 9,221,932 B2
(45) Date of Patent: Dec. 29, 2015

(54) ZIEGLER-NATTA TYPE CATALYSTS, METHODS OF PREPARING SAME, POLYMERS PRODUCED USING THE CATALYSTS AND ARTICLES PRODUCED THEREFROM

(75) Inventors: Robert J. Jorgensen, Scott Depot, WV (US); Burkhard E. Wagner, Highland Park, NJ (US); Cynthia A. Hepburn, Edison, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 0 days.

(21) Appl. No.: 12/873,038

(22) Filed: Aug. 31, 2010

(65) Prior Publication Data

US 2012/0053312 A1    Mar. 1, 2012

(51) Int. Cl.
| | |
|---|---|
| C08F 4/50 | (2006.01) |
| C08F 110/14 | (2006.01) |
| C08F 10/00 | (2006.01) |
| C08F 210/16 | (2006.01) |

(52) U.S. Cl.
CPC ............... *C08F 110/14* (2013.01); *C08F 10/00* (2013.01); *C08F 210/16* (2013.01)

(58) Field of Classification Search
CPC ....................................................... C08F 4/50
USPC ...................................................... 526/124.3
See application file for complete search history.

(56) References Cited

U.S. PATENT DOCUMENTS

| | | | |
|---|---|---|---|
| 4,302,565 A | 11/1981 | Goeke et al. | |
| 5,068,489 A | 11/1991 | Edwards et al. | |
| 5,241,023 A | * 8/1993 | Brule et al. | 526/70 |
| 6,001,766 A | * 12/1999 | Kissin et al. | 502/115 |
| 6,187,866 B1 | 2/2001 | Jorgensen et al. | |
| 6,617,405 B1 | 9/2003 | Jorgensen | |
| 2010/0292418 A1 | 11/2010 | Jorgensen et al. | |

FOREIGN PATENT DOCUMENTS

| | | |
|---|---|---|
| EP | 0771820 | 5/1997 |
| WO | 2005052010 A1 | 6/2005 |

OTHER PUBLICATIONS

PCT International Search Report, Written Opinion of the ISA and Notification of Transmittal dated Nov. 16, 2011 from the PCT counterpart application,PCT/US2011/048563.
EP Office Action dated Apr. 9, 2013; from EP counterpart Application No. 11749676.0.
Chinese Office Action dated Sep. 25, 2014; from Chinese counterpart Application No. 201180050953.3.
EP Response to Office Action dated Oct. 7, 2013; from EP counterpart Application No. 11749676.0.
Response to Chinese Office Action dated Sep. 25, 2014 filed Apr. 17, 2015 for counterpart Chinese Application No. 201180050953.3, 6 pages.

* cited by examiner

*Primary Examiner* — Brandon Fetterolf
*Assistant Examiner* — Sonya Wright

(57) ABSTRACT

A method for making a support impregnated Ziegler-Natta-type catalyst precursor including at least two transition metals and a support material wherein the resulting catalyst precursor is free-flowing is provided. Also provided is a process for producing a Ziegler-Natta type procatalyst by halogenating the free flowing catalyst precursor. The Ziegler-Natta type procatalyst and the reaction product of at least one monomer in the presence of the Ziegler-Natta type procatalyst and cocatalyst are also provided.

10 Claims, No Drawings

ZIEGLER-NATTA TYPE CATALYSTS, METHODS OF PREPARING SAME, POLYMERS PRODUCED USING THE CATALYSTS AND ARTICLES PRODUCED THEREFROM

FIELD OF THE INVENTION

The invention relates to novel support impregnated Ziegler-Natta procatalyst compositions which in combination with a cocatalyst form catalyst compositions with high polymerization activity which produce broad molecular weight distribution (MWD) granular polymers with high bulk density, well controlled particle size distributions and low fines levels. The invention further relates to articles produced using the polymers, such as films, blow molded containers, pipes and the like.

BACKGROUND OF THE INVENTION

The properties of a granular polymer, i.e. polymer powder recovered from a polymerization reactor, substantially depend upon the properties of the catalysts used to prepare the polymer. In particular, the choice of the shape, size, size distribution, and other morphological properties of a solid catalyst used to prepare a granular polymer is important to the resultant granular polymer properties and to ensure process operability. This is particularly important in gas phase and slurry polymerization processes. Preferably a catalyst composition used to prepare granular polymers should be based on a procatalyst particle having good mechanical properties, including resistance to wear, abrasion and shattering during the polymerization process. Such good mechanical properties of the procatalyst particles assist in imparting good bulk density and uniformity to the resulting polymer product. Additionally, a preferred catalyst composition would generate one polymer particle per catalyst particle, replicating the particle size distribution of the procatalyst particles. Procatalyst compositions that produce such granular polymers with high catalyst efficiency, particularly for use in multiple reactor systems, would also be preferred.

Particulate procatalysts with good morphological properties, i.e. generally spherical, narrow to moderately narrow particle size distribution, and resistance to attrition, are desirable to provide good operation in a gas phase fluidized bed reactor. For examples, support materials which are subject to attrition, lead to the production of polymer fines. Polymer fines, however, are undesirable due to buildup in the polymerization equipment, problems with bed level control, and entrainment in the cycle gas, which may cause equipment failure, impaired operability, and reduced efficiency. High levels of fines can also cause problems in downstream handling of the polymer upon exiting the polymerization process, such as poor flow in purge bins, plug filters in bins, and safety issues. Such issues make elimination or reduction of polymer fines important to commercial operations, especially gas-phase polymerization processes. Moreover, the reduction of polymer fines is particularly important in a multiple series reactor system, where the composition of the polymers produced in the separate reactors is widely variable due to the importance of precise bed level control.

With respect to the preparation of polyethylene and other ethylene/α-olefin copolymers, it is preferred to produce polymer in separate reactors with both large molecular weight differences and relatively large differences in incorporated comonomer. To produce final polymers with the best physical properties, it is preferred to have one of the reactors produce a polymer with high molecular weight and incorporating a majority of any comonomer present. In the second reactor, a low molecular weight portion of the polymer is formed which may also have comonomer incorporated generally in an amount less than that incorporated in the high molecular weight portion. In some instances, the low molecular weight portion of the polymer is a homopolymer.

Depending on the order of production of the different polymers in the multiple reactor system (that is production of high molecular weight polymer first and lower molecular weight polymer second or vice versa), polymers produced from the fines arising from known catalysts will tend to have significantly different polymer properties than the bulk of the polymer granules. Without being bound to any particular theory, it is currently believed that the differing polymer properties are due to the fact that the fines also tend to be the youngest polymer particles in the reactor and hence do not achieve conformation to the desired polymer properties before transiting to the second reactor in series. Such a difference in the fine and bulk polymer properties leads to challenges in compounding the polymer into pellets for end use.

In particular, with known catalysts, the polymer fines are normally of significantly different molecular weight or branching composition compared to the bulk polymer. Although the polymer particles created by the bulk procatalyst and the procatalyst fines will melt at roughly the same temperature, mixing is nevertheless hampered unless the polymer particles have a similar isoviscous temperature. The polymer fines, which tend to have significantly different molecular weight and isoviscous temperature than those of the bulk polymer, are not readily homogeneously mixed with the bulk polymer. Rather, the bulk polymer and polymer fines form segregated regions in the resulting polymer pellet which may lead to gels or other defects in blown films or other extruded articles made from the polymer pellets.

Supports, such as silica gels, aluminas, silica aluminas and the like are generally good candidates within and/or on which to place the active catalytic species. However, the support material should also fracture into small enough pieces such that it is the support material is not visible in articles, such as films, produced using the polymer produced using the supported catalyst.

Known Ziegler-Natta type catalysts containing two or more transition metals and prepared from precipitated compositions may produce resins with broad molecular weight distributions which are useful to make films and blow molded articles. However, such catalysts result in low resin bulk density, poor polymer particle size and shape and require complicated preparation procedures.

Also known are silica impregnated multiple metal Ziegler-Natta type catalysts. One such known catalyst is prepared using a specific aerogel and has generally low catalyst activity in terms of residual Titanium content. Yet other known multiple metal catalysts result in low resin bulk density and also exhibit insufficient catalyst activity for operation in linked reactor systems.

Accordingly, there is a need for procatalyst composition possessing sufficient strength and solidity to resist fragmentation and fines generation in order to minimize polymer fines production in an olefin polymerization process, and particularly in a series reactor polymerization process. It is also desirable to produce polymers with improved properties, particularly broader molecular weight distributions that are suitable for blow molding and other processes for producing articles such as films, pipes and containers.

SUMMARY OF THE INVENTION

A first aspect of the invention provides a process for making a supported Ziegler-Natta-type catalyst precursor comprising: treating a support material having surface hydroxyl groups, an average particle size of at least 10 microns and a surface area of at least 3 m²/g with a surface treatment reagent having the formula: $M(R)_zX_y$, where M is Mg, Al or Zn; X is a halogen; y is zero if M is Zn or Mg; z is 2; if M is Al, z+y=3; R is a $C_1$-$C_6$ alkyl group, in the presence of a hydrocarbon solvent, to form a surface treated support solution; removing substantially all of the hydrocarbon solvent from the surface treated support solution to form a surface treated support; contacting a Group 4 metal compound with one or more Titanium compounds selected from the group $TiCl_3$ (Al-activated or hydrogen-reduced), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ either in the presence of the alcohol solution or in a subsequent halogenation step to form a catalyst precursor solution; contacting the catalyst precursor solution with the surface treated support to form a supported catalyst precursor solution; and drying the supported catalyst precursor solution to form a free flowing support catalyst precursor.

In certain specific embodiments of the inventive process, the support material is silica, alumina, silica-alumina, or a combination thereof.

In some embodiments of the inventive process, the support material has an average pore size of at least 79 Angstroms.

The surface treatment reagent useful in some embodiments of the inventive process is butylethylmagnesium and di-n-butylmagnesium.

In some embodiments of the inventive process, the alcohol solution comprises ethanol, n-butanol, or a combination thereof.

Another aspect of the invention provides a process for producing a supported Ziegler-Natta-type procatalyst comprising halogenating the supported precursor composition produced by a process comprising treating a support material having surface hydroxyl groups, an average particle size of at least 10 microns and a surface area of at least 3 m²/g with a surface treatment reagent having the formula: $M(R)_zX_y$, where M is Mg, Al or Zn; X is a halogen; y is zero if M is Zn or Mg; z is 2; if M is Al, z+y=3; R is a $C_1$-$C_6$ alkyl group, in the presence of a hydrocarbon solvent, to form a surface treated support solution; removing substantially all of the hydrocarbon solvent from the surface treated support solution to form a surface treated support; contacting a Group 4 metal compound with one or more Titanium compounds selected from the group $TiCl_3$ (Al-activated or hydrogen-reduced), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution or during the halogenation step to form a catalyst precursor solution; contacting the catalyst precursor solution with the surface treated support to form a supported catalyst precursor solution; and drying the supported catalyst precursor solution to form a free flowing support catalyst precursor.

In yet another aspect of the invention, a supported Ziegler-Natta type catalyst precursor prepared according to the inventive process is provided.

Another aspect of the invention provides the reaction product of polymerizing at least one monomer, in the gas phase, in the presence of: (A) at least one catalyst precursor produced by contacting a Group 4 metal compound with one or more Titanium compounds selected from the group of $TiCl_3$ (Al-activated or hydrogen-reduced), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution or during the halogenation to form a catalyst precursor solution, contacting the catalyst precursor solution with a surface treated support formed by treating a support material having surface hydroxyl groups with a surface treatment reagent having the formula: $M(R)_zX_y$, where M is Mg, Al or Zn; X is a halogen; y is zero if M is Zn or Mg; z is 2; if M is Al, z+y=3; R is a $C_1$-$C_6$ alkyl group, in the presence of a hydrocarbon solvent, to form a surface treated support solution; removing substantially all of the hydrocarbon solvent from the surface treated support solution to form a precursor solution and removing the alcohol to form the at least one catalyst precursor; and (B) at least one co-catalyst.

Another aspect of the invention provides a process for making a supported Ziegler-Natta-type catalyst precursor consisting essentially of: treating a support material having surface hydroxyl groups, an average particle size of at least 10 microns and a surface area of at least 3 m²/a with a surface treatment reagent having the formula: $M(R)_zX_y$, where M is Mg, Al or Zn; X is a halogen; y is zero if M is Zn or Mg; z is 2; if M is Al, z+y=3; R is a $C_1$-$C_6$ alkyl group, in the presence of a hydrocarbon solvent, to form a surface treated support solution; removing substantially all of the hydrocarbon solvent from the surface treated support solution to form a surface treated support; contacting a Group 4 metal compound with one or more Titanium compounds selected from the group $TiCl_3$ (Al-activated or hydrogen-reduced), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution to form a catalyst precursor solution; contacting the catalyst precursor solution with the surface treated support to form a supported catalyst precursor solution; and drying the supported catalyst precursor solution to form a free flowing support catalyst precursor.

In another embodiment, the invention is an article comprising the reaction product of polymerizing at least one monomer, in the gas phase, in the presence of: (A) at least one catalyst precursor produced by contacting a Group 4 metal compound with one or more Titanium compounds selected from the group of $TiCl_3$ (Al-activated or hydrogen-reduced), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution or during the halogenation to form a catalyst precursor solution, contacting the catalyst precursor solution with a surface treated support formed by treating a support material having surface hydroxyl groups with a surface treatment reagent having the formula: $M(R)_zX_y$, where M is Mg, Al or Zn; X is a halogen; y is zero if M is Zn or Mg; z is 2; if M is Al, z+y=3; R is a $C_1$-$C_6$ alkyl group, in the presence of a hydrocarbon solvent, to form a surface treated support solution; removing substantially all of the hydrocarbon solvent from the surface treated support solution to form a precursor solution and removing the alcohol to form the at least one catalyst precursor; and (B) at least one co-catalyst.

In one embodiment, the article is a blow molded article. In one specific embodiment, the article is a blow molded container.

In one embodiment, the article is an injection molded article.

In one embodiment, the article is a pipe.

An inventive article may comprise a combination of two more embodiments as described herein.

DETAILED DESCRIPTION OF PREFERRED EMBODIMENTS OF THE INVENTION

The expression "catalyst" or "catalyst composition," as used herein, refers to transition metal compounds, or mixtures thereof, that are useful in catalyzing the polymerization of addition polymerizable monomers. Preferred catalysts are mixtures or complexes of non-metallocene transition metal compounds and magnesium compounds, such as magnesium chloride compounds, alternatively referred to as Ziegler Natta catalysts or Ziegler Natta type catalysts.

The term "procatalyst" as used herein means a catalyst composition ready to be injected or fed into a polymerization reactor and that is activated to an active polymerization catalyst within the polymerization reactor by an additional component, a cocatalyst, such as an aluminum alkyl cocatalyst.

The terms "precursor" and "catalyst precursor" as used herein mean a portion of the catalyst composition containing the transition metals that is subjected to an additional reaction step to convert it into a procatalyst.

The term "polymer" is used herein to indicate, for example, a homopolymer, a copolymer, or a terpolymer. The term "polymer" as used herein also includes interpolymers, such as those made by the copolymerization of ethylene with $C_3$-$C_{10}$ α-olefins or polypropylene with $C_4$-$C_{10}$ α-olefins.

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application.

In one aspect, the invention provides a method for making the inventive precursor composition, comprising: a) providing a liquid composition comprising i) a magnesium halide compound or magnesium compound that is convertible to magnesium halide via halogenation, ii) an alcoholic solvent or diluent, iii) at least two transition metal compounds wherein the transition metals are selected from the metals of Groups 3-10 and of the Periodic Table of the Elements and wherein one of the metals is Titanium and the other metal is Zirconium or Hafnium or both, and iv) a surface treated support material; b) drying the composition; and c) collecting the resulting solid particles as a free flowing supported precursor. Representative magnesium compounds that convert to $MgCl_2$ in the presence of the alcohol solution include magnesium alkoxides and magnesium alkyl carbonates.

In another aspect, the invention provides a method for making the inventive precursor composition, consisting essentially of: a) providing a liquid composition comprising i) a magnesium halide compound or magnesium compound that is convertible to magnesium halide via halogenation, ii) an alcoholic solvent or diluent, iii) at least two transition metal compounds wherein the transition metals are selected from the metals of Groups 3-10 of the Periodic Table of the Elements and wherein one of the metals is Titanium and the other metal is Zirconium or Hafnium or both, and iv) a surface treated support material; b) drying the composition to form a free flowing supported precursor; and c) collecting the resulting solid particles which are a supported precursor powder. Representative magnesium compounds that convert to $MgCl_2$ in the presence of the alcohol solution include magnesium alkoxides and magnesium alkyl carbonates.

In yet another embodiment, the invention further provides a method of halogenating the precursor powder to form an inventive procatalyst.

In another aspect of the invention, the procatalyst composition produces resins with an inherently broad molecular weight distribution.

One embodiment of the invention provides an improved catalyst produced using the inventive procatalyst with greater mechanical strength that results in reduced polymer fines while, at the same time, possessing good polymerization response and efficiency.

In still another aspect, the invention relates to a process for making a polymer comprising contacting at least one olefin monomer with the inventive procatalyst or with a supported procatalyst made by the inventive method, and a cocatalyst and optionally a continuity aid under olefin polymerization conditions to form a polymer product.

In yet other embodiments, the supported procatalyst particles are combined with a cocatalyst to form the active catalyst composition. The activation may occur prior to or simultaneously with, or after contacting with the monomer or monomers to be polymerized.

In another embodiment, the inventive supported procatalyst is partially or fully activated outside the polymerization reactor by contacting the supported procatalyst with a portion of the cocatalyst in an inert liquid hydrocarbon as disclosed in U.S. Pat. Nos. 6,187,866 and 6,617,405, the disclosures of which are incorporated herein by reference. After contacting the supported procatalyst composition with the cocatalyst, the hydrocarbon solvent may be removed by drying or, preferably, the catalyst composition may be directly fed to the polymerization reactor where the activation is completed with additional amounts of the same or a different cocatalyst.

More specifically, in certain embodiments, the inventive supported precursor composition is prepared by drying a solution embedded within the pores and interstices of the support, said solution comprising magnesium compound and the mixture of Group 4 metal compounds in a primary diluent, especially a diluent comprising one or more C2-C6 alcohols, said solution having sufficient solubility in the primary diluent such that essentially all of the solute is contained within the pores and interstices of the support following the drying step, and subsequently halogenating the resulting solid particles. Preferred transition metal halides are a mixture of titanium trichloride (which may be complexed with $AlCl_3$ if desired), zirconium tetrachloride and hafnium tetrachloride.

Compounds useful in embodiments of the invention include compounds that may be halogenated to the respective chloride including Magnesium Ethyl Carbonate, Magnesium Ethoxide, $Hf(OR)_{(4-x)}Cl_x$, where x is from 2 to 4, and R is methyl, ethyl, isopropyl, isobutyl or butyl, $Ti(OR)_{(4-y)}Cl_y$, where y is 0 to 2 and R is methyl, ethyl, isopropyl, isobutyl or butyl, $Ti(R_1)_{(4-y)}R^2_y$, where y is 0 to 2 and $R_1$ is a chelating ligand such as 2,4 pentanedionate and $R^2$ is Cl or OR as described above and Titanium+3 Chloride, either as the aluminum activated or hydrogen reduced form; $Zr(OR)_{(4-z)}Cl_z$, where z is 2 to 4 and R is methyl, ethyl, isopropyl, isobutyl or butyl.

Halogenating agents useful in embodiments of the invention include organoaluminum halides, especially alkylaluminum sesquichlorides, such as ethylaluminum sesquichloride, $Al_2(C_2H_5)_3Cl_3$, and isobutylaluminum sesquichloride, $Al_2(iC_4H_{10})_3Cl_3$.

Embodiments of the invention provide catalysts that produce polymers with high molecular weight fractions greater than $10^6$ g/mole and particularly >$10^7$ g/mole.

In some embodiments, the catalysts have a relatively low decay rate, that is, a first order deactivation constant ($K_d$) of less than 0.8 hr$^{-1}$ and most preferably less than 0.4 hr$^{-1}$.

Yet other embodiments of the invention provide catalysts with a particle size distribution span, "(D90–D10)/D50," less than, or equal to, 2.

Yet other embodiments of the invention provide catalysts that produce resins with high settled bulk density and low fines levels.

In some embodiments of the invention, the catalysts produced from the inventive precursors are also very active at low added cocatalyst levels, with excellent polymerization activity occurring with added (via cocatalyst feed) Al/Ti mole ratios in the reactor of less than 25/1, as low as 17/1, and as low as 10/1, although higher amounts may be used. When used in multiple reactor systems, the catalysts produced from the inventive precursors and methods may retain full polymerization activity in the subsequent reactor(s), even in the absence of additional cocatalyst feed.

In some embodiments, the catalyst precursor composition is prepared by dissolution of a magnesium compound, a titanium compound, a hafnium compound and/or a zirconium compound in an alcoholic solvent, in the presence of the surface treated support.

The transition metal compounds may be halides, alkoxides, mixed alkoxide/2,4 pentandionates, and mixtures thereof. Preferably, the transition metal compounds exhibit good solubility in alcoholic solvents. In specific embodiments, titanium compounds including $TiCl_3$ (Al-activated or hydrogen-reduced) and $Ti(2,4\ pentanedionate)_2(OR)_2$, where R is ethyl, isopropyl, n-propyl or n-butyl are used. In other embodiments, zirconium and hafnium compounds used are the chlorides or mixed alkoxy chlorides, including, for example, ethoxide, propoxide, and butoxide. In certain embodiments, magnesium compounds used include $MgCl_2$, magnesium ethyl carbonate, and mixtures thereof.

Embodiments of the invention utilize alcohols for use as solvent, including alcohols having two or more carbon atoms, including, for example, ethanol, propanol, isopropanol and butanol. C2 through C4 alcohols are used in certain embodiments and ethanol and n-butanol are utilized as the solvent in specific embodiments.

Embodiments of the invention utilize any of a number of halogenation agents known in the art. In some embodiments, the halogenation agents are organoaluminum halides, especially alkylaluminum sesquichlorides, such as ethylaluminum sesquichloride ($Al_2(C_2H_5)_3Cl_3$).

Some embodiments of the inventive catalysts possess one or more of the following properties: (a) produce polymers with high molecular weight fractions greater than $10^6$ g/mole; (b) have a relatively low decay rate, that is, a first order decay constant of less than 0.8 Hr$^{-1}$; (c) have a catalyst particle size distribution span, (d90–d10)/d50, less than, or equal to, 2; and (d) produce resins with high settled bulk density.

Support Materials

Support materials useful in embodiments of the invention are solid, particulate, porous materials, which are inert to the other components of the catalyst system, and inert during subsequent polymerization. Suitable support materials include inorganic materials, such as oxides of silicon and/or aluminum. In some embodiment, the support materials have an average particle size from 10 microns to 250 microns. All individual values and subranges from 10 microns to 250 microns are included herein and disclosed herein; for example, the average particle size may be from a lower limit of about 10 microns, 13 microns, 18 microns, or 23 microns to an upper limit of about 250 microns, 221 microns, 174 microns, or 137 microns. In some embodiments, the support materials have a surface area of at least 3 square meters per gram ($m^2$/g). All individual values greater than or equal to 3 $m^2$/g are included herein and disclosed herein; for example, the surface area could be at least 3 $m^2$/g, at least 19 $m^2$/g, at least 36 $m^2$/g, or at least 51 $m^2$/g.

Polymerization activity of the inventive catalyst compositions may, in some embodiments, be improved by employing a silica support having an average pore size of at least 79 Angstroms. All individual values of average pore size of greater than or equal to 79 Angstroms are included herein and disclosed herein; for example, the average pore size may be at least 84 Angstroms, at least 91 Angstroms, at least 96 Angstroms, or at least 100 Angstroms.

Silicas useful in the invention include, but are not limited to, Davison Grade 948 or 955 (available from the Grace Davison Materials & Packaging. Technologies division of W.R. Grace & Co.), Ineos ES757 silica gel (available from Ineos Silicas, England (now, a part of PQ Corporation)) or PQ silica gel (available from PQ Corporation).

In some embodiments, the support material is dried, that is, substantially free of, or alternatively free of, physisorbed water; e.g., less than 1 wt %, alternatively less than 0.7 wt %, or alternatively less than 0.5 wt % water. Drying of the support material may be effected by any known methods, including for example, heating at a temperature of at least 200° C. to any temperature below the sintering temperature of the support. In those embodiments employing silica gel as the support material, the support is preferably dried at a temperature of at least 200° C. and no higher than 800° C. All individual values and subranges from at least 200° C. and no higher than 800° C. are included herein and disclosed herein; for example, the drying temperature may be from a lower limit of 200° C., 253° C., 305° C., or 398° C., to an upper limit of 800° C., 768° C., 705° C., or 652° C. It should be recognized that retention of surface hydroxyl groups may be useful in tethering catalyst components to the support surface, and therefore, the drying step should preferably not eliminate all surface hydroxyl groups.

Surface Treatment Reagents

The support may optionally be treated with about one wt % to about eight wt % of one or more of aluminum alkyl, aluminum alkyl halide, alkyl magnesium or alkyl zinc compounds. Suitable compounds for use in embodiments of the invention have the formula $M(R4)_zX_y$, where M is either Mg, Al or Zn; X is a halogen, in preferred embodiments, Cl; y is zero if M is Zn or Mg; and z is 2; and if M is Al, z+y=3, and z has values from 2 and 3. R4 is a C1-C6 alkyl group and is preferably, methyl, ethyl, isobutyl, n-butyl or n-hexyl. In those embodiments in which M is Al or Zn, R4 is preferably an ethyl group. In those embodiments in which M is Mg, R4 is preferably ethyl, n-butyl, or a mixture thereof.

In particular, when using a silica support material or other support material, such as alumina, that have surface hydroxyl groups, it is preferable that a majority of the surface hydroxyl groups be capped with one of the support treatment reagents.

The impregnation of the precursor composition into and/or onto the support may, in various embodiments, utilize one or more of the methods, except as modified expressly herein, disclosed in U.S. Pat. Nos. 4,302,565 and 5,068,489 and European Patent 771820, the disclosures of each of which are incorporated herein by reference. In embodiments of the invention, the method of impregnation of the precursor composition is not conducted in a solution of an electron donor, as in the incorporated references, but rather in a protic solvent such as the aforementioned alcohols in which the precursor and other catalyst components are substantially soluble.

The subsequent halogenation step may use hydrocarbon solvents in embodiments of the inventive process. Hydrocarbon solvents useful in embodiments of the invention include aliphatic and aromatic C5+ hydrocarbons. In some embodiments, isopentane, hexane, heptane or mixtures thereof are preferred hydrocarbon solvents.

Preparation of an Impregnated Precursor Composition:

The following description of a preferred method for preparation of an impregnated precursor composition is intended to be illustrative and not limiting of the inventive process.

Step A: Dehydration of Support Material:

The support material, preferably a silica gel, is charged to a fluid bed dehydrator and heated under fluidization with air to the desired dehydration temperature. The fluidizing gas velocity is maintained between greater than 2 and less than 20 times the minimum fluidization velocity of the support material. All individual values and subranges from between greater than 2 and less than 20 times the minimum fluidization velocity of the support material are included herein and disclosed herein; for example, the drying temperature may be from a lower limit of 2 times, 3 times, or 5 times the minimum fluidization velocity of the support material to an upper limit of 20 times, 17 times or 14 times the minimum fluidization velocity of the support material. In a preferred embodiment, the gas velocity is approximately 10 times the minimum fluidization velocity of the support material. The support material is held at the final drying temperature greater than 1 hour and less than 48 hours. All individual values and subranges from between greater than 1 hour and less than 48 hours are included herein and disclosed herein; for example, the time at the final drying temperature may be from a lower limit of 1.5 hrs, 5.5 hrs, or 10.25 hrs to an upper limit of 47.5 hrs, 35 hrs, or 23 hrs. The support material is then cooled. Cooling may take place under nitrogen or partially in air until the support temperature reaches approximately 1.50° C. with nitrogen gas then substituted for air. The material is finally discharged from the dehydrator and stored under an inert gas, preferably nitrogen gas. All subsequent steps in preparation of the impregnated precursor composition are carried out under an inert gas (in some embodiments, nitrogen gas) blanket.

Step B: Surface Treatment of the Support:

The support material is placed in a mixing vessel which provides good solids mixing. For example, a mix tank equipped with a helical ribbon agitator may be used. Approximately 750-1000 grams of the support material is charged to the mixing vessel for every 3 liters of hydrocarbon solvent charged to the mixing vessel. Sufficient support material is added to the solvent to form a slurry of the support material in the hydrocarbon solvent. Surface treatment reagent is added to achieve the desired wt % loading based on the amount of support material added to the mixing vessel. In some embodiments of the inventive process, the surface treatment reagent is soluble in aliphatic hydrocarbon solvents, whereas in other embodiments, the surface treatment reagent is soluble in aromatic hydrocarbon solvents. The support material, surface treatment reagent and solvent are maintained at a temperature of between 20° C. and 100° C. for a time of between 30 minutes and 48 hours during which a majority of the surface hydroxyl groups are capped with the support treatment reagents. In certain embodiments of the inventive process, contact times are between 1 and 4 hours. The hydrocarbon solvent may then be removed by any known method or combination of known methods. By way of example and not limitation, the hydrocarbon solvent may be removed by filtration or decantation of the solvent, followed by evaporative drying to further reduce solvent levels.

In those embodiments of the inventive process wherein the hydrocarbon solvent is isopentane or hexane, the hydrocarbon solvent may be evaporated at or near atmospheric pressure with a jacket temperature of about 70° C. The hydrocarbon solvent is removed until a dry free flowing powder is produced.

In other embodiments of the inventive process, vacuum or partial vacuum drying may also be used to remove the hydrocarbon solvent. In alternative embodiments of the inventive process, a combination of any of such methods may be used to remove the hydrocarbon solvent.

Following removal of the hydrocarbon solvent, the surface treated support material is removed and stored under an inert gas. In certain embodiments of the inventive process, the surface treated support material is stored under dry nitrogen gas.

Step C: Preparation of Precursor Composition Solution:

In some embodiments of the invention, the precursor composition, in the form of a solution, is prepared by dissolving one or more of the halides of the metals, i.e. $MgCl_2$, $TiCl_3$, $HfCl_4$ and/or $ZrCl_4$, in an alcoholic solvent. In other embodiments, the precursor solution is prepared using $Hf(OR)_4$ and/or $Zr(OR)_4$.

In those embodiments utilizing $HfCl_4$ and/or $ZrCl_4$ as the sources of the additional transition metal, without being bound by any particular theory, the following reaction is believed to occur: $HfCl_4$ or $ZrCl_4 + 2ROH \rightarrow 2HCl + HfCl_2(OR)_2$ and/or $ZrCl_2(OR)_2$. The reaction is believed to only produce two moles of HCl per mole of transition metal due to steric hindrance and the moderate temperatures used in the preparation of the precursor solution.

Further dissolved in the alcoholic solvent is a titanium compound selected from the group of $TiCl_3(AlCl_3)_{0.33}$, $TiCl_3$ (obtained by hydrogen reduction of $TiCl_4$) if present as the halide, and $Ti(OR)_4$ compound where R is ethyl, isopropyl or butyl.

In some embodiments of the inventive process, $Ti(OR)_4$ is used. In such instances, without being bound to any particular theory, it is believed that the following reaction occurs: $Ti(OR)_4 + 2HCl \rightarrow Ti(OR)_2Cl_2 + 2ROH$, thereby allowing the titanium compound to act as an acidity scavenger. That is, one mole of the titanate would neutralize the acidity from one mole of Hf or Zr tetrachloride.

Further dissolved in the alcoholic solvent is a magnesium compound. In some embodiments, one or more of $Mg(OCO_2C_2H_5)_2$, $Mg(OC_2H_5)_2$ and other lower alkoxides of magnesium are utilized. In some instances, and without being bound to any particular theory, it is believed that the following reaction may occur: $Mg(OCO_2C_2H_5)_2 + 2HCl \rightarrow MgCl_2 + 2CO_2 + 2C_2H_5OH$ thereby allowing $Mg(OCO_2C_2H_5)_2$, when used, to act as an acidity scavenger while also producing a component of the catalyst, i.e. $MgCl_2$. An exemplary preparation of a precursor composition solution useful in some embodiments of the invention is described below.

An alcohol (e.g., ethanol, n-propanol or n-butanol) which has been dried to less than 100 ppm by volume water and is substantially oxygen free is charged to a reactor equipped with agitation and both heating and cooling capability. Sufficient alcohol, one or more magnesium compounds, titanium compounds, hafnium compounds, zirconium compounds or mixtures thereof are charged to the reactor. The reactor contents may then be heated to between 30 and 120° C. while stirring to dissolve the components and to form a solution. The solution may be passed through a filter to remove undissolved materials and insoluble impurities, such as oxides of the metal components, and is then stored under an inert gas, e.g., dry nitrogen gas. In those embodiments of the inventive process utilizing magnesium dichloride, less than 1.0% of charged $MgCl_2$ may remain insoluble.

Step D: Preparation of Impregnated Precursor Composition:

The surface treated support material is added to a reactor equipped with agitation and both heating and cooling capability. The precursor composition solution and additional alcohol are charged to the reactor to form a slurry. If necessary, excess gas is vented and the slurry is agitated between 30 minutes and 48 hours.

The slurry is then dried by any known method to produce an impregnated precursor powder. For example, in embodiments of the inventive process in which a jacketed reactor is used, the jacket temperature may be elevated with venting of solvent gasses. Alternatively, vacuum or partial vacuum drying, alone or in combination with heating, may be used in certain embodiments of the inventive process. In yet another embodiment of the inventive process, the solvent may be removed by passing a dried inert gas over or through the slurry. The resulting dried impregnated precursor powder may, in some embodiments of the inventive process, then be cooled to less than about 45° C.

Step E: Halogenation of Precursor Composition to Form Procatalyst

In some embodiments of the invention, the solid catalyst precursor powder is halogenated to form a procatalyst. The procatalyst, in turn, is subsequently contacted with an activating co-catalyst to form the active catalyst, in some embodiments of the invention. In certain embodiments of the invention, halogenations of the solid catalyst precursor may include chlorination, bromination, iodination, or a combination of any thereof. References to the halogenations step as chlorination are exemplary, as occurring in certain embodiments of the invention, and are not limiting.

In some embodiments of the invention, complete or substantially complete halogenation is desired. Halogenation of the catalyst precursor may be conducted in any manner with sufficient forcing conditions to ensure complete or substantially complete halogenation. Forcing conditions include, but are not limited to, increasing the inherent propensity or strength of halogenation of the halogenation agent, specifically the propensity to exchange alkoxide for halide ligands, increasing the relative amount or concentration of the halogenation agent, or increasing the reaction temperature employed in the halogenation reaction. The reaction temperature employed in the halogenation reaction may be between 40 and 100° C., and in some specific embodiments of the invention, the halogenation temperature is between 50 and 75° C. Subject to the desired complete or substantially complete halogenation, the procatalyst may be prepared, in some embodiments of the invention, by the following method.

Dried mineral oil is charged to a clean mix vessel, in an amount sufficient to produce a substantially smooth slurry with the catalyst precursor powder. In some embodiments of the invention, the substantially smooth slurry includes between 20 and 35 wt % of the precursor powder.

Following formation of the slurry, the halogenation agent is added at a rate such that the desired halogenation temperature is not exceeded. The rate at which the halogenation agent is added is not critical and is simply a function of the heat removal capability of the mix vessel. The ratio of precursor powder to halogenating agent may vary depending upon the desired level of precursor halogenation. Agitation may be continued for a time sufficient to disperse the precursor powder and the halogenating agent. If the temperature in the mix vessel remains lower than the desired final reaction temperature, heat may be applied to reach the final reaction temperature, optionally followed by a hold period at the reaction temperature to complete reaction. Alternatively, cooling may be applied at any point during the halogenation reaction in those instances in which the desired final reaction temperature is lower than the mix vessel temperature. The resulting procatalyst may then be discharged and stored under an inert gas prior to use.

In alternative embodiments of the invention, the precursor powder is halogenated by mixing the precursor powder and halogenating agent in a light hydrocarbon diluent, such as isopentane, hexane, heptane or mixtures of other light hydrocarbons. The diluent is of low moisture levels, preferably less than 100 ppm water, and more preferably less than 50 ppm water and substantially oxygen free. In such embodiments, the resulting slurry may either be filtered or decanted to remove the light hydrocarbon diluent following halogenation. Optionally, the resulting solids or filter cake may be washed to further remove any reaction by-products of the halogenation reaction. Finally, the halogenated precursor composition may either be dried to free flowing solid procatalyst or again dispersed in a mineral oil diluent for slurry feed into a polymerization reactor.

In yet other embodiments, the halogenation procedure may use an in-line, plug-flow type system, such as that described in U.S. Pat. Nos. 6,187,866 and 6,617,405, the disclosures of each of which is incorporated herein by reference. In embodiments utilizing an in-line, plug-flow type system, the catalyst precursor powder may be dispersed in a mineral oil, mixed with the halogenating agent, and pumped in-line, into the polymerization reactor. Suitable heating and cooling methods, as are known, may be used to control the temperatures of the resulting procatalyst mixture, and the time for reaction to proceed may be provided as residence time zones. By way of example, in some embodiments, small vessels with minimal back-mixing may provide the residence time zone, or, in alternative embodiments, extended lengths of tubing/piping may provide the residence time zone for the halogenations reaction.

The conditions used in the halogenation reaction may also have an impact on the amount of high molecular weight fraction produced by the catalyst, the inherent polymerization activity of the catalyst at a standard set of conditions, and the final polymer particle size and polymer bulk density.

Both the reducing power and the concentration of the halogenation agent are factors in conversion of the catalyst precursor to procatalyst. Embodiment of the invention utilize a molar ratio of halogen (in the halogenation agent) to residual alkoxide functionality (including both free alcohol remaining in the catalyst precursor particles and alkoxides that may have either formed by reaction of transition metal components with the alcoholic solvent, or have been present as part of the transition metal component, and measured by dissolution of the precursor compound in an aqueous media, such that all alkoxides are converted to the precursor alcohols by Gas Chromatographic determination) from >1 to 4 moles of halogen contained in the halogenation agent per mole of alkoxide. All individual values and subranges from between >1 hour and 4 moles of halogen per mole of alkoxide are included herein and disclosed herein; for example, the halogen to alkoxide molar ratio may be from a lower limit of 1.1, 1.3, or 2.1 to an upper limit of 2.3, 3.0, or 3.9.

In some embodiments, the halogenation agents are of moderate to low reducing power. Aluminum alkyl halides are particularly useful with compounds of the general formula $AlR_xCl_y$, where x<2 and x+y=3. In some embodiments, such an aluminum alkyl halide has a value of y between 1.5 and 2 and R is selected from the group of ethyl, n-propyl, n-butyl and isobutyl species. In specific embodiments, the halogenation agent is ethylaluminum sesquichloride (EASC), ethylaluminum dichloride, or a combination thereof.

Dried hydrocarbon solvent, typically hexane, heptane or isopentane or mixtures thereof, is charged to a mixing vessel, in an amount sufficient to produce a smooth slurry with the impregnated precursor powder. Typically, the slurry contains between 20 and 35 wt % impregnated precursor powder.

Following formation of the slurry, the halogenation agent is added at a rate such that excessive reaction does not occur in the mixing vessel. The amount of halogenation agent used is determined from the amount of residual solvent/alkoxide remaining in the dried impregnated precursor powder and the desired level of precursor halogenation.

If the temperature in the mix vessel is lower than the desired final reaction temperature, heat is applied to reach the desired reaction temperature, followed by a hold period at that temperature to complete reactions. Alternately, cooling may be applied if the halogenation temperature desired is lower than the temperature the reaction mixture reaches adiabatically. Following the halogenations reaction, the hydrocarbon solvent may be removed by way of any known method such as evaporation. In some embodiments, the hydrocarbon solvent is removed by washing the resulting procatalyst composition one or more times with additional hydrocarbon solvents as described previously to remove reaction by-products, such as aluminum alkoxides and any excess and unreacted halogenation agent. In such embodiments, the washed procatalyst composition may then either be filtered or decanted to remove the hydrocarbon solvent. The remaining procatalyst composition solids may be washed again with a hydrocarbon solvent, for example, isopentane, hexane, or a combination thereof, in some embodiments, to further remove any reaction by-products, followed by further evaporation or decantation. Following washing and removal of by-products and initial drying, the procatalyst composition solids may be further dried to form free flowing solid procatalyst and stored under an inert gas prior to use. Alternatively, in some embodiments, the free flowing solid procatalyst may be dispersed in a mineral oil diluent to form a slurry.

The polymers produced using the supported Ziegler-Natta catalysts of the invention may be used to manufacture a shaped article, or one or more components of a shaped article. Such articles may be single-layer or a multi-layer articles, which are typically obtained by suitable known conversion techniques, applying heat, pressure, or a combination thereof, to obtain the desired article. Suitable conversion techniques include, for example, blow-molding, co-extrusion blow-molding, injection molding, injection stretch blow molding, compression molding, extrusion, pultrusion, calendering and thermoforming. Shaped articles provided by the invention include, for example, films, geomembranes, blow molded articles, such as blow molded containers, injection molded articles, compression molded articles, drip tapes, coatings, fibers, pipes, tubing, profiles and moldings.

Preparation of Inventive and Comparative Examples

The Inventive Examples illustrate some of the particular embodiments of the invention, but the following should not be construed to mean the invention is limited to such particular embodiments.

Process to Produce Impregnated Procatalyst Using $Et_3Al$-Surface Treated Silica Silica support material, ES 757 silica (available from PQ Corporation) was dehydrated at 600° C. and added to isopentane to form a slurry. Triethyl aluminum solution was added to the slurry to achieve a loading of 5.8 wt % on the silica gel. The dried surface treated silica was then obtained by drying the silica slurry at >60° C. to remove the isopentane and to obtain a free flowing powder.

A solution of $MgCl_2$ (obtained from SRC), $AA-TiCl_3$ (obtained from W.R. Grace & Co.) and $HfCl_4$ (obtained from Aldrich) in ethanol (Grade SD-2B obtained from Pharmco-AAPER, a member of the Greenfield Ethanol family of companies) was prepared and then added to the dried surface treated silica. The mixture was then dried to form a free flowing solid impregnated precursor. The impregnated precursor compositional aim was for a 5/1/1 mole ratio of Mg/Ti/Hf and about 0.25 mm/gram of Titanium contained in the catalyst precursor. Mass balance was used to estimate the amount of residual ethanol which was calculated to be about 15 wt %.

The impregnated precursor composition was then suspended in hexane. Chlorination was achieved with an aim Cl/(Ethanol+ethoxide) mole ratio of 3 using ethyl aluminum sesquichloride (EASC) as the halogenation agent with a contact time of 2 hours at a temperature of 70° C. The EASC was added over about a one hour period to minimize the rate of gas evolution due to reaction of residual ethanol with the EASC. After the halogenation reaction was completed, the solid resultant silica impregnated procatalyst was decanted and washed twice with isopentane solvent. The impregnated procatalyst was then dried. The dried procatalyst, Inventive Procatalyst A, was free flowing and amenable to dry catalyst feed.

Process to Produce Impregnated Procatalysts Using Butyl Ethyl Magnesium (BEM)-Modified Silicas Two Ineos 757 silica support samples were utilized; Support B was dehydrated at 200° C. and Support C was dehydrated at 650° C.

Sufficient butylethylmagnesium (BEM) was added to samples of support B and support C to produce solid supports containing 4 to 4.2 wt % magnesium on the surface treated silicas. The BEM treated supports B and C were dried as described in Example 1. The BEM treated supports B and C were analyzed to determine Mg content and the results are given in Table 1.

A solution of $AA-TiCl_3$ (obtained from W.R. Grace & Co.) and $HfCl_4$ (obtained from Sigma-Aldrich Co.) in ethanol (Grade SD-2B obtained from Pharmco-AAPER, a member of the Greenfield Ethanol family of companies) was prepared. The BEM treated supports B and C were then separately added to an aliquot of the ethanol solution to form Inventive Precursor B and Inventive Precursor C, respectively. Initial addition temperature was controlled to be less than 30° C. to minimize the exothermic reaction between the alkyl groups on the BEM treated supports and the ethanol solution of metal halides.

For both Inventive Precursor B and Inventive Precursor C, the amount of ethanol solution and BEM treated support was adjusted to achieve a 5/1/1 molar ratio of Mg/Ti/Hf with a nominal Titanium content of 0.25 millimoles/gram contained in the final precursor composition. The slurries of support B and support C were then dried as in Example 1 to produce free flowing powders, Inventive precursor B and Inventive Precursor C, respectively. The metals content and residual ethoxide content of Inventive Precursor B and Inventive Precursor C are given in Table 2.

Chlorination of Inventive Precursor B and Inventive Precursor C was conducted as described in Example 1 except that the final temperature was 75° C. and the hold time was one hour. The resultant dried solids are Inventive Procatalyst B and Inventive Procatalyst C, respectively.

TABLE 1

| Sample | Mg, wt % |
| --- | --- |
| Support B | 4.00 |
| Mmol/g | 1.65 |
| Support C | 4.23 |
| Mmol/g | 1.74 |

TABLE 2

| Sample | Mg, wt % | Si, wt % | Ti, wt % | Hf, wt % | EtO—, wt % |
| --- | --- | --- | --- | --- | --- |
| Precursor B | 2.83 | 24 | 1.21 | 4.71 | 17.2 |
| Mmol/g | 1.16 | | 0.25 | 0.26 | 4.0 |
| Precursor C | 2.73 | 24.5 | 1.33 | 4.45 | ~15% |
| Mmol/g | 1.12 | | 0.28 | 0.25 | 3.5 |

Comparative Procatalyst D

Comparative catalysts were prepared following the method described in WO2009088701, the disclosure of which is incorporated herein by reference. Comparative Procatalyst D was prepared following the catalyst example 3 of WO2009088701 with the exception that the HfCl₄ component was omitted from the precursor feedstock solution prior to spray drying to prepare Comparative Catalyst Precursor D. Comparative Procatalyst D was prepared by halogenating the spray dried Comparative Catalyst Precursor D using the same methods used for producing Inventive Procatalyst C with the exception that the Cl/(ethanol+ethoxide) molar ratio was 2. Comparative Procatalyst D was then suspended in mineral oil.

Comparative Procatalyst E

Comparative Procatalyst E was prepared following the examples of U.S. Pat. No. 6,187,866, except as expressly described. A feedstock primarily containing anhydrous tetrahydrofuran (THF), which has been dried to less than about 50 ppm water, was heated to approximately 50° C. Granular magnesium metal (100 to about 4000 micron in particle size) was then added to the THF followed by addition of titanium tetrachloride. The mixture was then heated to approximately 70° C. Without being bound by any particular theory, it is currently believed that the Mg metal chemically reduces the titanium tetrachloride to lower valence states, primarily to the +3 valence state. A Mg/Ti molar ratio of slightly higher than 0.5 was used to assure essentially complete reduction of the $Ti^{+4}$ to lower valence states. Magnesium Dichloride was then added to bring the total molar ratio of Magnesium to Titanium in the mixture to between 5.5:1 and 6:1. This mixture was then heated and mixed further for approximately 4 to 6 hours followed by filtration to remove any unreacted magnesium metal and impurities present in the magnesium dichloride that were insoluble in the THF. Finally, fumed silica, Cab-O-Sil TS-610, was added and mixing was continued until the fumed silica was dispersed, producing a spray drying feedstock. Per 100 liters of THF, 4.8 to 5 moles of Magnesium metal, 9.7 to 10.1 moles of titanium tetrachloride and 49 to 55 moles of magnesium dichloride were used to make the solution. Approximately 6.2 to 7 kilograms of the fumed silica were added to produce the spray drying feedstock. The spray drying feedstock was spray dried using an 8-foot diameter closed cycle spray dryer equipped with a rotary atomizer using nitrogen as the drying gas. The rotary atomizer was adjusted to give catalyst particles with a D50 of 25 microns. The spray dried catalyst precursor contained approximately 2.5 weight percent Ti, 6.3 weight percent Mg, and 25 to 29 weight percent THF. The spray dried catalyst precursor particles had a D50 of 25 microns and a span [(D90-D10)/D50] of <2 as determined by means of a Leeds and Northrup Microtrac® particle size analyzer using a dodecane solvent. The discrete catalyst precursor particles were mixed with mineral oil under a nitrogen atmosphere to form a slurry containing approximately 28 weight percent of the solid catalyst precursor. The catalyst precursor slurry was then admixed with tri-hexylaluminum at a 0.15 to 0.17 molar ratio of Al to THF to form Comparative Procatalyst E prior to polymerization.

Polymerization Using Inventive Procatalyst A and Comparative Procatalyst D

Inventive Procatalyst A and Comparative Procatalyst D were each then used in a polymerization reaction. Polymerization conditions and properties of the resulting resin are given in Table 3. A gas phase reaction system equivalent to that described in U.S. Pat. No. 6,617,405, the disclosure of which is incorporated herein by reference, was used, except as expressly provided. Triethylaluminum was used as the cocatalyst and Inventive Procatalyst A was fed as a dry powder. Comparative Procatalyst D was fed to the reactor as a mineral oil suspension.

TABLE 3

| | Inventive Procatalyst A | Inventive Procatalyst A | Comparative Procatalyst D |
| --- | --- | --- | --- |
| REACTION CONDITIONS | | | |
| Temp. ° C. | 80.1 | 85.0 | 85.0 |
| C2 Partial Pressure, psi | 70.0 | 70.1 | 89.8 |
| H2/C2 Molar Ratio | 0.158 | 0.090 | 0.080 |
| C6/C2 Molar Ratio | 0.011 | 0.011 | 0.009 |
| Catalyst Feed Method | Dry | Dry | Mineral Oil Suspension |
| Isopentane Mol % | 21.5 | 22.5 | 13.7 |
| Production Rate, lb/hr | 37.0 | 32.6 | 40.4 |
| RESIN PROPERTIES | | | |
| Flow Index, $I_{21}$, dg/min | 1.42 | 1.12 | 1.95 |
| $I_{21}/I_5$ | 13.40 | 10.60 | 11.90 |
| Density, g/cm³ | 0.9398 | 0.9389 | 0.9411 |
| Titanium, ppm w/g resin | 1.9 | 1.24 | 1.90 |
| Aluminum, ppm w/g resin | 31.4 | 26.80 | 34.00 |
| Bulk Density, lb/ft³ | 24.3 | 26.31 | 26.20 |
| APS, inches | 0.025 | 0.027 | 0.026 |

Polymerization Using Inventive Procatalysts B and C and Comparative Procatalyst E Polymerizations using Inventive Procatalyst B and Inventive Procatalyst C were conducted as in a staged reactor configuration as disclosed in polymerization examples 6 and 7 of WO 2009088701, the disclosure of which is incorporated herein by reference. Triethylaluminum was used as the cocatalyst. Reaction Conditions of and properties of the produced resin produced in the first reactor are given in Table 4. Inventive Procatalyst B and Inventive Procatalyst C were each fed into their respective reactors as a mineral oil suspension.

TABLE 4

| Type | Inventive Procatalyst B | Inventive Procatalyst C | Comparative Procatalyst E |
|---|---|---|---|
| REACTION CONDITIONS | | | |
| Temp. ° C. | 85.00 | 85.00 | 80 |
| C2 Part. Pressure, psi | 50.45 | 52.86 | 34.2 |
| H2/C2 Molar Ratio | 0.0835 | 0.1400 | 0.042 |
| C6/C2 Molar Ratio | 0.0194 | 0.0121 | 0.0380 |
| Catalyst Feed Type | Mineral Oil Suspension | Mineral Oil Suspension | Mineral Oil Suspension |
| Isopentane Mol % | ~15 | 21.63 | <5 |
| Continuity Additive* | 10 ppm/gram resin in the fluidized bed | 10 ppm/gram resin in the fluidized bed | 0 |
| Energy Balance Production Rate, lb/hr | 34.60 | 32.30 | 34.9 |
| Bed Weight, lbs | 104.40 | 112.77 | 68.1 |
| SGV (ft/sec) | 1.60 | 1.64 | 1.6 |
| RESIN PROPERTIES | | | |
| Flow Index, $I_{21}$, dg/min | 0.365 | 0.733 | 0.41 |
| Density, g/cm$^3$ | 0.9298 | 0.9378 | 0.9301 |
| Titanium, ppm w/g resin | 2.68 | 3.75 | 2.7 |
| Aluminum ppm w/g resin | 24.25 | 29.66 | 110 |
| Bulk Density, lb/ft$^3$ | 20.95 | 22.17 | 21.3 |
| APS, inches | 0.026 | 0.021 | 0.029 |
| Fines, Wt % LT 120 Mesh | 2.70 | 3.05 | 1.6 |

*Continuity additive is a 1:1 mixture by weight of aluminum distearate and diethyoxylated stearyl amine that is added to the reactor to improve operation.

The resin product from the first reactor (using each of Inventive Procatalyst B, Inventive Procatalyst C, and Comparative Procatalyst E) was then transferred, semi-continuously to a second reactor operating at substantially different reaction conditions, as shown in Table 5. Table 5 further lists the resin properties of the final resin. Energy Balance Production Rate is calculated from an energy balance and corrected using actual mass production rates.

TABLE 5

| | Inventive Procatalyst B | Inventive Procatalyst C | Comparative Procatalyst E |
|---|---|---|---|
| REACTION CONDITIONS | | | |
| Temp. ° C. | 112.00 | 111.99 | 109.9 |
| Pressure, psig | 400.00 | 394.04 | 388 |
| C2 Part. Pressure, psi | 85.68 | 90.28 | 84.6 |
| H2/C2 Molar Ratio | 1.80 | 1.80 | 1.8 |
| E.B. Production Rate, lb/hr | 41.47 | 32.20 | NA** |
| Bed Weight, lbs | 141.30 | 118.82 | 116.8 |
| SGV (ft/sec) | 1.6 | 1.97 | 1.6 |
| Mass Balance Product Rate (Sum of first and second reactors) | 74.6 | 70.7 | |

TABLE 5-continued

| | Inventive Procatalyst B | Inventive Procatalyst C | Comparative Procatalyst E |
|---|---|---|---|
| RESIN PROPERTIES | | | |
| Flow Index, $I_{21}$ (dg/min) | 8.54 | 10.73 | 9.8 |
| $I_5$ (dg/min) | 0.3 | 0.456 | 0.44 |
| $I_{21}/I_5$ | 28.47 | 23.55 | 22.5 |
| Density, g/cm$^3$ | 0.9502 | 0.9539 | 0.9501 |
| Titanium, ppm w/g resin | 1.44 | 2.29 | 1.5 |
| Aluminum ppm w/g resin | 19.53 | 24.36 | 55 |
| Bulk Density, lb/ft$^3$ | 24.57 | 24.77 | 24.5 |
| APS, inches | 0.026 | 0.023 | 0.029 |
| Fines, Wt % LT 120 Mesh | 1.9 | 2.03 | 2.5 |
| Split % by X-ray | 53.7 | 61.0 | 56.8 |

**Reactor insulation was removed and therefore, accurate energy balance data is unavailable.

A film was made from the polymer resin produced using Inventive Procatalyst C and Comparative Procatalyst E and evaluated for gels. A sample of the granular polymer produced using each of Inventive Procatalyst C and Comparative Procatalyst E was first blended with a stabilizer, approximately 2000 ppm of butylated hydroxytoluene. Each of these mixtures were then separately extruded using a small pelletizing extruder and the extruded resins were used to produce films, having about 50 micron thickness, using a Brabender laboratory extruder. Several sections of the films were visually evaluated for gels and imperfections and given a Film Appearance Rating. A good rating is one in which essentially no visible gels or imperfections are visible in the film. For Procatalyst C, the Film Appearance rating was good indicating that the silica support fractured. Moreover, visual microscopy showed that the polymer particles were substantially spherical and uniform in size, predicting good operation in fluidized beds. The film produced using resin prepared with Comparative Procatalyst E had a poor Film Appearance rating, indicating the substantial visible gels and imperfections.

Test Methods

The following test methods were used:

Particle Size Distribution

D10, D50 and D90 on catalysts were measured using either a Malvern or Leeds and Northrup particle size analyzer. Polymer particle size distribution was calculated using the data obtained from screen measurement using a standard set of mesh sieves—

10/18/35/60/120/200/pan (having mesh opening sizes of 2000/1000/500/250/125/70/0 microns respectively) and calculated using the mass of resin retained on each sieve. Fines are defined as resin particles on the 200 mesh screen and on the pan. The pan fraction actual size is generally assumed to be the average of 70 and zero, i.e. 35 microns.

Density

Resin density was measured by the Archimedes displacement method, ASTM D 792-00, Method B, in isopropanol. Specimens were measured within one hour of molding, after conditioning in the isopropanol bath at 23° C., for 8 minutes, to achieve thermal equilibrium prior to measurement. The specimens were compression molded according to ASTM D-4703-00, Annex A, with a five minutes initial heating period at about 190° C., and a 15° C./min cooling rate per Procedure C. The specimen was cooled to 45° C. in the press, with continued cooling until "cool to the touch."

Melt Flow Rate by Extrusion Plastomer

Melt flow rate measurements for the ethylene-based polymers were performed according to ASTM D-1238-04, Condition 190° C./2.16 kg, Condition 190° C./5 kg and Condition 190° C./21.6 kg, which are known as $I_2$; $I_5$ and $I_{21}$, respectively. Melt flow rate is inversely proportional to the molecular weight of the polymer. Thus, the higher the molecular weight, the lower the melt flow rate, although the relationship is not linear. Melt Flow Ratio (MFR) is the ratio of melt flow rate ($I_{21}$) to melt flow rate ($I_2$), unless otherwise specified.

Residual Metals

Titanium, aluminum and hafnium residuals were measured as ppm by wt using X-ray Diffraction techniques with appropriate standards.

Bulk Density

The Bulk Density measurement was a poured bulk density using a standard 500 cc volumetric cylinder.

Deactivation Rate Constant

The deactivation rate of the catalyst is determined by simultaneously discontinuing product discharge from the first reactor and discontinuing catalyst feed. The decrease in reaction rate is then plotted against time and a $1^{st}$ order deactivation rate constant determined via curve fit.

Split

The split is the relative ratio of polymer produced between the two reactors and can be calculated either by energy balance or by comparison of residual Titanium values. The split is then calculated, i.e., Split by Production Rate=$1^{st}$ Reactor Energy Balance Rate/Total Production Rate;

Split by X-ray=Residual Ti (ppm) $2^{nd}$ Reactor/Residual Ti ppm $1^{st}$ Reactor.

We claim:

1. A process for making a supported Ziegler-Natta-type catalyst precursor comprising:
    selecting one or more free flowing surface treated support materials, wherein said one or more free flowing surface treated materials comprises the reaction product of one or more support materials and one or more surface treatment agents in the presence of a hydrocarbon solvent, wherein said support materials have surface hydroxyl groups, an average particle size of at least 10 microns and a surface area of at least 3 m²/g, and wherein said surface treatment reagent has the formula: $M(R)_zX_y$, where M is Al or Zn; X is a halogen; y is zero if M is Zn; z is 2; if M is Al, z+y=3; R is a C1-C6 alkyl group
    contacting a Group 4 metal compound with one or more Titanium compounds selected from the group $TiCl_3$ and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution to form a catalyst precursor solution;
    contacting the catalyst precursor solution with the one or more free flowing surface treated support materials to form a supported catalyst precursor solution; and
    drying the supported catalyst precursor solution to form a free flowing support catalyst precursor.

2. The process of claim 1 wherein the support material is silica, alumina, silica-alumina, or a combination thereof.

3. The process of claim 1 wherein the support material has an average pore size of at least 79 Angstroms.

4. The process of claim 1 wherein the surface treatment reagent is triethylaluminum.

5. The process of claim 1 wherein the alcohol solution comprises ethanol, n-butanol, or a combination thereof.

6. A process for producing a supported Ziegler-Natta-type procatalyst comprising halogenating the supported precursor composition produced by the process of claim 1.

7. A supported Ziegler-Natta type catalyst precursor prepared according to the process of claim 1.

8. A supported Ziegler-Natta type procatalyst prepared according to the process of claim 6.

9. A process for producing a granular polyolefin polymer comprising contacting in a polymerization reactor at least one α-olefin monomer, at least one catalyst precursor produced by contacting a Group 4 metal compound with one or more Titanium compounds selected from the group of $TiCl_3$ and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution to form a catalyst precursor solution, contacting the catalyst precursor solution with one or more free flowing surface treated support materials, wherein said one or more free flowing surface treated materials comprises the reaction product of one or more support materials and one or more surface treatment agents in the presence of a hydrocarbon solvent, wherein said support materials have surface hydroxyl groups, an average particle size of at least 10 microns and a surface area of at least 3 m²/g, and wherein said surface treatment reagent has the formula: $M(R)_zX_y$, where M is Al or Zn; X is a halogen; y is zero if M is Zn; z is 2; if M is Al, z+y=3; R is a C1-C6 alkyl group to form a precursor solution and removing the alcohol to form the at least one catalyst precursor; and at least one co-catalyst.

10. A process for making a supported Ziegler-Natta-type catalyst precursor consisting essentially of:
    selecting one or more free flowing surface treated support materials, wherein said one or more free flowing surface treated materials comprises the reaction product of one or more support materials and one or more surface treatment agents in the presence of a hydrocarbon solvent, wherein said support materials have surface hydroxyl groups, an average particle size of at least 10 microns and a surface area of at least 3 m²/g, and wherein said surface treatment reagent has the formula: $M(R)_zX_y$, where M is Al or Zn; X is a halogen; y is zero if M is Zn; z is 2; if M is Al, z+y=3; R is a C1-C6 alkyl group;
    contacting a Group 4 metal compound with one or more Titanium compounds selected from the group $TiCl_3$ (Al-activated or hydrogen-reduced), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution to form a catalyst precursor solution;
    contacting the catalyst precursor solution with the one or more free flowing surface treated support materials to form a supported catalyst precursor solution; and
    drying the supported catalyst precursor solution to form a free flowing support catalyst precursor.

* * * * *